United States Patent Office 3,268,477
Patented August 23, 1966

3,268,477
PROCESS FOR CURING POLYEPOXIDES WITH CARBOXYLIC ACIDS AND METALLIC OXIDES
Albert C. Mueller, Berkeley, Calif., assignor to Shell Oil Company, a corporation of Delaware
No Drawing. Filed Dec. 23, 1958, Ser. No. 784,836
13 Claims. (Cl. 260—47)

This invention relates to a process for curing polyepoxides with polycarboxylic acids. More particularly, the invention relates to a process for curing polyepoxides with polycarboxylic acids using a new type of activator and to the resulting cured products.

Specifically, the invention provides a new and highly practical process for curing polyepoxides with polycarboxylic acids at an increased rate which comprises mixing and reacting the polyepoxide with the polycarboxylic acid in the presence of a small amount of an oxide of a metal of Groups 2a and 2b of the Periodic Table of Elements. The invention further provides cured products obtained by the above-described process which products are characterized by their good hardness and flexibility.

Dicarboxylic acids should be useful curing agents for polyepoxides, such as the glycidyl polyethers of polyhydric phenols. These acids, however, have certain disadvantages which have limited their utilization in this application. It has been found, for example, that the reaction between the acids and the polyepoxides is too slow for most commercial applications. The use of high temperatures speed the reaction, but the temperatures are difficult to apply in some cases and the use of the high temperatures generally initiate other types of polymerization reactions and the resulting products have poor physical properties.

It has been found that tertiary amines may be used to speed the reaction between the dicarboxylic acids and the polyepoxides, but this technique also has its disadvantages. It has been found, for example, that the tertiary amines form stable salts with many of the polycarboxylic acids and high temperatures are again required for the cure. This difficulty is particularly evident when the mixtures are used as binders for oxidizers, such as ammonium perchlorate in making solid propellants. In this application, the tertiary amines also react with the oxidizer to slow cure.

It is, therefore, an object of the invention to provide a new process for curing polyepoxides. It is a further object to provide a new technique for curing polyepoxides with polycarboxylic acids. It is a further object to provide a method for curing polyepoxides with dicarboxylic acids that gives a good rate of reaction at the lower temperatures. It is a further object to provide a new process for accelerating the cure of polyepoxides with dicarboxylic acids, particularly when used in combination with oxidizers in the preparation of solid propellants. It is a further object to provide polycarboxylic acid cured epoxy resins having improved properties. Other objects and advantages of the invention will be apparent from the following detailed description thereof.

It has now been discovered that these and other objects of the invention may be accomplished by the process of the invention which comprises mixing and reacting the polyepoxide with a polycarboxylic acid in the presence of a small amount of an oxide of a metal of Groups 2a and 2b of the Periodic Table of Elements, such as, for example, magnesium oxide. It has been found that the above-noted special oxide activators have an unexpected ability to initiate a good rate of reaction between the polycarboxylic acid epoxy material without the use of high temperatures. This is particularly true when the polyepoxides are being cured in combination with oxidizers, such as ammonium perchlorate. In addition, the cured products obtained by this method have excellent physical properties, such as excellent hardness, strength and chemical resistance. Evidence of the superiority of the above-noted activators over the known agents, such as tertiary amines, is noted in the working examples at the end of the specification.

The acid used as curing agent in the process of the invention may be any polycarboxylic acid. They may be di-, tri- or higher polycarboxylic acids and may be aliphatic, cycloaliphatic, aromatic or heterocyclic acids. Examples of the acids include, among others, succinic acid, adipic acid, sebacic acid, 1,2-dodecanedioic acid, 1,2-eicosanedioic acid, 8,11-eicosadienedioic-1,20 acid, cyclohexenedicarboxylic acid, tetrahydrophthalic acid, phthalic acid, terephthalic acid, isophthalic acid, tetrachlorophthalic acid, maleic acid, acids obtained by condensing maleic acid with unsaturated compounds, such as drying oils and the like, acids obtained by polymerizing drying oil fatty acids, such as dimerized and trimerized linoleic acid and dimerized and trimerized soybean oil acids, acids obtained by polymerizing unsaturated acids, such as acrylic acid, by themselves or with other monomers, such as butadiene and styrene, and acid-containing polyesters obtained by reacting polycarboxylic acids with polyhydric alcohols, and the like.

A specially preferred group of acids, particularly when products are desired which have outstanding flexibility and distensibility, are the special long chain polycarboxylic acids obtained by reacting a cyclic anhydride with a long chain polyether polyhydric alcohol having a molecular weight above 400, and preferably between 600 and 10,000, said polyhydric alcohols being the reaction product of a polyhydric alcohol and an alkylene oxide or alkylene oxide derivative.

The expression "cyclic anhydride" as used herein refers to polycarboxylic acid anhydrides having the

group in a cyclic structure, such as, for example, anhydride of the formula

wherein R is a radical derived from the polycarboxylic acid by removing two of the carboxyl groups.

Examples of the cyclic anhydrides include, among others, succinic anhydride, maleic anhydride, octadecenyl succinic anhydride, dodecenyl succinic anhydride, chlorendic anhydride, methyl Nadic anhydride, Nadic anhydride, and anhydrides obtained by reacting maleic anhydride with unsaturated compounds, such as oils, terpinene, long chain unsaturated acids and the like, as well as anhydrides of lesser value as the aromatic anhydrides as phthalic anhydride, pyromellitic anhydride, chlorophthalic anhydride and the like. Particularly preferred are the aliphatic and cycloaliphatic hydrocarbon polycarboxylic acid anhydrides, and especially the dicarboxylic acid anhydrides containing no more than 20 carbon atoms.

The long chain polyhydric alcohols used in making the long chain acids are obtained by reacting one mole of a polyhydric alcohol with a plurality of moles of an alkylene oxide or substituted alkylene oxide so as to yield a long chain product having a molecular weight of at least 400. The long chain alcohols derived from the dihydric alcohols may be exemplified by the following formula

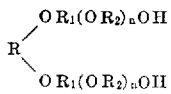

wherein R is a radical derived from the dihydric alcohol by removing the two OH groups, and $R_1$ and $R_2$ are radicals derived from the alkylene oxide by removing the epoxy groups, and $n$ is an integer greater than 1. Those derived from the trihydric alcohols may be exemplified by the following formula

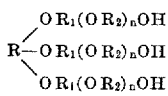

wherein R is a radical derived from the trihydric alcohol by removing the three OH groups, and $R_1$ and $R_2$ and $n$ are as described above.

The polyhydric alcohols to be used in reacting with the alkylene oxides or substituted alkylene oxides may be exemplified by ethylene glycol, propylene glycol, butylene glycol, 1,5-pentanediol, 1,4-butanediol, 1,6-hexanediol, glycerol, trimethylolpropane, 1,2,6-hexanetriol, polyallyl alcohol, copolymers of allyl alcohol and styrene, copolymers of allyl alcohol with acrylates and the like, and polyols obtained by reacting polyallyl alcohol with dibasic acids or anhydrides. Particularly preferred polyhydric alcohols include the aliphatic polyhydric alcohols containing from 2 to 4 hydroxyl groups and from 2 to 10 carbon atoms. Of particular value, as noted hereinafter, are the trihydric alcohols, such as glycerol and 1,2,6-hexanetriol.

The alkylene oxides and substituted alkylene oxides used in reaction with the polyhydric alcohols to form the desired long chain material include those having a terminal

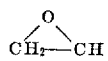

group, such as, for example, ethylene oxide, propylene oxide, butylene oxide, amylene oxide, hexylene oxide, octylene oxide and decylene oxide, styrene oxide, epichlorohydrin, glycidyl ethers and glycidyl esters, such as glycidyl methacrylate, glycidyl phenyl ether, allyl glycidyl ether and the like. Especially preferred are the alkylene oxides containing from 2 to 6 carbon atoms, such as ethylene oxide, propylene oxide and butylene oxide.

In making the long chain material, a single alkylene oxide may be used or a mixture of two or more of the different alkylene oxides or substituted derivatives may be used. It is also within the scope of the invention to employ long chain polyhydric alcohols obtained by reacting the polyhydric alcohol with one or more of the alkylene oxides or derivatives and then reacting the material further with additional alkylene oxide or derivatives of a different type so as to give a "block" type structure.

If the alkylene oxide is the same as the polyhydric alcohol with the exception that it contains an epoxy group in place of the OH groups, the alcohol will have the same units and may be termed a polyoxy alkylene glycol, as polypropylene glycol.

In making the long chain material, one mole of the polyhydric alcohol is reacted with a plurality of moles of the alkylene oxide or substituted derivative depending on the number of units and molecular weight desired. In most cases, there will be at least four moles of the alkylene oxide or alkylene oxide derivative reacted per OH group on the polyhydric alcohol molecule, and preferably from 6 to 30 moles reacted per OH group. The polyhydric alcohol resulting from the reacting of alcohols with the alkylene oxides or derivatives as used in the present invention have molecular weights of at least 400, and preferably between 600 and 10,000. Still more preferably, they have molecular weights of 600 to 3,000. The molecular weights are determined ebullioscopically in ethanol.

The preparation of the long chain polyhydric alcohols from the above-described polyhydric alcohols and alkylene oxides or substituted derivatives may be accomplished by methods known to the art wherein the oxide or derivative introduced into a reaction vessel containing the polyhydric alcohol, and preferably an alkylene catalyst, such as caustic potash, caustic soda, sodium carbonate, sodium methylate or the like, in amounts varying from about .1% to 4%. Solvents, such as benzene, xylene, cyclohexane and the like, may be used if desired. Temperatures used in the reaction generally range from about .1% to 4%. Solvents, such as benzene, xylene, cyclohexane and the like, may be used if desired. Temperatures used in the reaction generally range from about 70° C. to 200° C. and preferably between 100° and 150° C.

The adducts used in the process of the invention are obtained by reacting one or more of the above-described cyclic anhydrides with any of the above-described long chain polyhydric alcohols. The reactants are employed in such proportions so as to form a half ester with at least two of the OH groups present on the long chain polyhydric alcohol molecules. Thus, the adducts of the long chain polyhydric alcohols derived from the oxides and the dihydric alcohols may be exemplified by the following formula

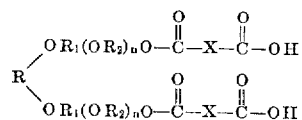

wherein R, $R_1$, $R_2$ and $n$ are as described above for the related long chain polyhydric alcohol formula and X is a radical derived from the cyclic anhydride by removing the anhydride group. The corresponding adduct derived from the cyclic anhydrides and the long chain polyhydric alcohols derived from the trihydric alcohols may be exemplified by the following formula:

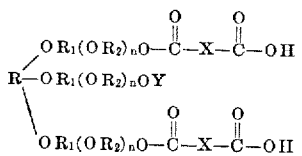

wherein R, $R_1$, $R_2$ and $n$ are as described above for the related long chain polyhydric alcohol formula, X is a radical derived from the cyclic anhydride by removing the anhydride group, and Y is hydrogen or a

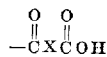

radical.

The adducts are prepared by reacting the above-described cyclic anhydrides and the long chain polyhydric alcohols together in proportions needed to effect the esterification of the terminal OH groups as noted above, preferably in the presence of an acidic catalyst. Suitable catalysts include, among others, p-toluenesulfonic acid, hydrochloric acid, acetic acid, succinic acid and the like. Such catalysts are preferably employed in amounts ranging from about .1% to 3% by weight of the reactants.

Temperatures employed in the formation of the adducts preferably range from about 50° C. to 150° C. In the presence of catalysts, temperatures much above 200° C. should not be employed as further esterification of the adducts may take place under such conditions.

The preparation of several of the adducts to be used in the working examples is illustrated below:

ADDUCT OF GLYCEROL - MIXED POLYPROPYLENE POLYETHYLENE GLYCOL POLYHYDRIC ALCOHOL AND MALEIC ANHYDRIDE 311 grams of the glycerol-mixed polypropylene polyethylene glycol polyhydric alcohol which had a molecular weight of about 2600 was combined with 40 grams of maleic anhydride and 2 grams of p-toluene sulfonic acid. The mixture was heated for several hours at a temperature between 70–100° C. The heating was stopped when the theoretical acid number had been reached. The resulting product was a clear fluid having a viscosity of about 100 poises, acidity of .121 eq./100 g. and ester value of .110 eq./100 g.

ADDUCT OF 1,2,6-HEXANETRIOL-POLYPROPYLENE GLYCOL POLYHYDRIC ALCOHOL AND SUCCINIC ANHYDRIDE 401 parts of the 1,2,6-hexanetriol-polypropylene glycol alcohol which had a molecular weight of about 1500 was combined with 80 parts of succinic anhydride and 2 grams of p-toluene sulfonic acid. The mixture was heated for several hours at a temperature between 70–100° C. The heating was stopped when the theoretical acid number had been reached. The resulting product was a clear fluid having a viscosity of about 100 poises, acidity of .173 eq./100 g. and ester value of .168 eq./100 g.

ADDUCT OF 1,2,6-HEXANETRIOL-POLYPROPYLENE GLYCOL POLYHYDRIC ALCOHOL AND DODECENYLSUCCINIC ANHYDRIDE 150 parts of the 1,2,6-hexanetriol-polypropylene glycol alcohol which had a molecular weight of about 2500 was combined with 51 parts of succinic anhydride and 2 grams of p-toluene sulfonic acid. The mixture was heated for 24 hours at a temperature between 70–100° C. The heating was stopped when the theoretical acid number had been reached. The resulting product was a clear fluid having a viscosity of about 70 poises, acidity of .10 eq./100 g. and ester value of .097 eq./100 g.

ADDUCT OF GLYCEROL-MIXED POLYPROPYLENE - POLYETHYLENE GLYCEROL POLYHYDRIC ALCOHOL AND METHYL NADIC ANHYDRIDE 311 parts of the glycerol mixed polypropylene glycol-polyethylene glycol polyhydric alcohol having a molecular weight of 2600 was combined with 73.5 parts of methyl Nadic anhydride and 2 grams of p-toluene sulfonic acid. The mixture was heated for several hours at a temperature between 70° C. and 100° C. The heating was stopped when the theoretical acid number had been reached. The resulting product was a clear fluid having a viscosity of about 120 poises, acidity of .105 eq./100 g. and ester value of .10 eq./100 g.

The activator for the acid-epoxide reaction comprises the oxides of magnesium, barium, zinc, cadmium, and the like.

According to the process of the invention, the polyepoxide is cured by admixing and reacting the polyepoxide with one or more of the above-described polycarboxylic acids and one or more of the above-described metal oxides. The amount of the polycarboxylic acid to be used may vary over a wide range. Good cures are obtained by reacting the polyepoxide with at least .8 equivalent of the acid. As used herein in relation to the amount of acid and polyepoxide, the expression "equivalent" refers to that amount of acid needed to furnish one carboxyl group per epoxy group to be involved in the cure. To obtain the best results, the acid should be employed in at least a chemical equivalent amount, and more preferably, the acid and epoxy compound should be used in chemical equivalent ratios varying from 1:1 to 1.5:1.

The activator, i.e., the above-noted metal oxides, are needed only in very small amounts. Excellent results are obtained when the activator is utilized in amounts varying from about 0.1% to 6% by weight of the resin, i.e. resin containing both the acid and the polyepoxide, and more preferably, in amounts varying from 0.1% to 4% by weight of the resin.

The acid and the oxide may be combined together before they are added to the polyepoxide or they may be added separately.

In executing the process of the invention, it is sometimes desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent. Various solvents are suitable for achieving the desired fluidity. They may be volatile solvents which escape from the polyepoxide composition by evaporation before or during the curing, such as ketone, isophorone, etc., esters such as ethyl acetate, butyl acetate, Cellosolve acetate (ethylene glycol monoacetate), methyl Cellosolve acetate (acetate of ethylene glycol monomethyl ether) etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc., and/or alcohols, such as ethyl, isopropyl or n-butyl alcohol. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile benzonitrile, and the like. It is also convenient to employ the solid or semisolid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. As indicated, the above-described acid-activator combination are active at a lower temperature, e.g., about 53° C. to 80° C. and the cure may be accomplished by merely mixing the anhydride-activator combination with the polyepoxide as indicated above and then applying some heat at room temperature. In some applications, it may be desirable to effect a more rapid cure and this may be accomplished by raising the temperature. Excellent rates of cure are obtained at temperatures from 50° C. to 120° C. and these are preferred for many applications where heating is permissible. Temperatures much above 200° C. are generally not desirable, but may be employed if necessary.

The curing agent-polyepoxide systems described above may be utilized for a great variety of important applications. The systems described above are very useful in the preparation of pottings and castings. They are particularly suitable for preparing very large castings that can be cured at low temperatures without liberation of large amounts of heat and this gives a more even cure which results in much stronger and more durable products. In this application, the mixture of polyepoxide, anhydride and activator alone or with suitable diluents is added to the desired mold or casting and then allowed to set at room temperature. Heat may be applied in some cases to hasten cure.

As noted above, the process of the invention is particularly adapted for use in preparing solid propellants for use in rockets and the like. The process is particularly suited for such an application as the resulting propellant has excellent flexibility and distensibility as well as strength and resistance to solvents and water. In addition, the binder does not interfere with the proper functioning of the oxidizer when utilized as a fuel. In this application, the acid, polyepoxide, catalyst and appropriate oxidizer, such as ammonium perchlorate, ammonium nitrate, potassius perchlorate, lithium nitrate and the like (in approximate amount, e.g., 50% to 85% based on weight of the combined mixture) are combined together and then heat cured as the above-noted castings and pottings. The resulting solid propellant can then be used directly as a solid fuel.

The above-described systems are also useful in the preparation of laminates. In this application, the sheets of fibrous material are first impregnated with the mixture of polyepoxide, anhydride and activator. This is conveniently accomplished by dissolving the acid and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting paper, asbestos paper, mica flakes, cotton batts, duck muslin, canvas and the like. It is usually preferred to utilize woven glass cloth that has been given prior treatment with well known finishing or sizing agents therefor, such as chrome methacrylate or vinyl trichlorosilane.

In the above applications, the resulting cured products are characterized by their excellent hardness, durability and good water resistance as well as by lack of discoloration which accompanies many of the other anhydride cured systems.

The polyepoxides to be used in this application comprise those materials possessing more than one vicinal epoxy group, i.e., more than one

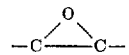

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include epoxidized esters of polyethylenically unsaturated monocarboxylic acids, such as epoxidized linseed, soybean, perilla, oiticia, tung, walnut and dehydrated castor oil, methyllinoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,4-epoxybutyl) citrate, and di(4,5-epoxyoctadecyl) malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids, such as, for example, Dimethyl 8,9,12,13-diepoxyeiconsanedioate,
Dibutyl 7,8,11,12-diepoxyoctadecanedioate,
Dioctyl 10,11-diethyl-8,9,12,13-diepoxy-eiconsanedioate,
Dihexyl 6,7,10,11-diepoxyhexadecanedioate,
Didecyl 9-epoxy-ethyl-10,11-epoxyoctadecenedioate,
Dibutyl 3-butyl-3,4,5,6-diepoxycyclohexane-1,2-dicarboxylate,
Dicyclohexyl 3,4,5,6-diepoxycyclohexane-1,2-dicarboxylate,
Dibenzyl 1,2,4,5-diepoxycyclohexane-1,2-dicarboxylate and
Diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

The polyether epoxides reported in the examples are those given in U.S. 2,633,458.

*Example 1*

This example illustrates the unexpected superiority in cure that is obtained by reacting polyether A with a long chain acid obtained by reacting maleic anhydride with glycerol-mixed polyethylene polypropylene glycol having a mol wt. of 2500 and magnesium oxide as the accelerator.

22 parts of polyether A was combined with 78 parts of the dicarboxylic acid obtained by reacting maleic anhydride with the polyethylene glycol and 2 parts of magnesium oxide and 200 parts of ammonium perchlorate. The mixture was blended with stirring and cured at 65° C. for 21 hours and 120° C. for 4 hours. The resulting product was a hard homogeneous casting having a high tensile strength of good flexibility.

In a related experiment, the same proportions of polyether A and adduct of maleic acid and polyethylene glycol were combined with 2% tri(dimethylaminoethyl)phenol and 200 parts ammonium perchlorate and mixture heated at the same temperature ranges. It required over twice as long to obtain a product which even then did not have the same desired properties.

*Example II*

This example illustrates the rapid rate of cure that is obtained by reacting polyether A with a long chain acid obtained by reacting maleic anhydride with a 1,2,6-hexanetriol-polypropylene glycol polyhydric alcohol having a mol wt. of 1500 and magnesium oxide as the accelerator.

28 parts of polyether A was combined with 72 parts of the long chain dicarboxylic acid obtained from 1,2,6-hexanetriol-polypropylene glycol and succinic anhydride and 1.5% by weight of magnesium oxide and 200 parts of ammonium perchlorate. The mixture was blended with stirring and heated at 65° C. for 24 hours and 4 hours at 120° C. The product was a hard homogeneous casting having a high tensile strength and good flexibility.

*Example III*

26 parts of polyether A was combined with 74 parts of a long chain polycarboxylic acid obtained by reacting maleic anhydride with polypropylene glycol having a molecular weight of 2000 and 3% magnesium oxide and 200 parts of ammonium perchlorate. This mixture was blended with stirring and cured at 80° C. The product was a homogeneous casting having excellent flexibility and good strength.

*Example IV*

40 parts of polyether A is combined with 60 parts of dimerized linoleic acid and 3% magnesium oxide and 200 parts of ammonium perchlorate. This mixture was blended with stirring and cured at 80° C. for 16 hours. The resulting product was a hard homogeneous casting having good strength and elongation.

*Example V*

17 parts of polyether A was combined with 83 parts of a long chain polycarboxylic acid obtained by polymerizing butadiene with acrylic acid having mol wt. of 1600, 2.5% of magnesium oxide and 200 parts of ammonium perchlorate. The mixture was blended and cured at 80° C. for 18 hours and 2 hours at 120° C. The product was a hard homogeneous casting having good strength and elongation.

*Example VI*

21 parts of polyether A was combined with 79 parts of an adduct of maleic anhydride and a polyhydric alcohol obtained from glyceral and propylene oxide having a molecular weight of 3000 and 1.5 parts of magnesium oxide and 200 parts of ammonium perchlorate. The resulting mixture is stirred and heated at 65° C. for 25 hours and 120° C. for several hours. The product is a hard homogeneous casting having a good flexibility and strength.

*Example VII*

16.7 parts of epoxidized 2,2'-dimethyl tetrahydrobenzyl tetrahydrobenzoate polyether A was combined with 83.3 parts of an adduct of maleic anhydride and a polyhydric alcohol comprising glycerol-mixed propylene-ethylene glycol having a molecular weight of 2500 and 2 parts of magnesium oxide and 200 parts of ammonium perchlorate. The mixture was blended by stirring and cured at 80° C. The resulting product was a hard homogeneous casting having good strength and elongation.

*Example VIII*

21 parts of epoxidized 2,2'-dimethyl tetrahydrobenzyl tetrahydrobenzoate was combined with 79 parts of an adduct of maleic anhydride and hexanetriol-polypropylene glycol having a molecular weight of 1500 and 2.3% of magnesium oxide. The mixture was blended by stirring and cured at 16 hours at 80° C. and 4 hours at 120° C. The resulting product was flexible and tough.

*Example IX*

20 parts of polyether A are combined with 80 parts of an adduct of dodecenyl succinic anhydride and a polyhydric alcohol comprising the reaction product of 1,2,6-hexanetriol and propylene oxide having a molecular weight of 2500, 3 parts of magnesium oxide and 200 parts of ammonium perchlorate. The mixture is stirred and cured at 80° C. for several hours. The resulting product has good strength and flexibility.

*Example X*

35.2 parts of polyether A are combined with 64.8 parts of an adduct of methyl Nadic anhydride and polybutylene glycol having a molecular weight of 500, 3 parts of magnesium oxide and 200 parts of ammonium perchlorate. The resulting mixture was cured at 80° C. The product was a hard homogeneous casting having good strength and flexibility.

*Example XI*

25 parts of polyether A are combined with 75 parts of an adduct of maleic anhydric and a polyhydric alcohol comprising the reaction product of 1,2,6-hexanetriol and propylene oxide having a molecular weight of 2500, 1 part of magnesium oxide and 200 parts of ammonium perchlorate. The mixture is stirred and cured at 100° C. The resulting product has good strength and flexibility.

*Example XII*

This example illustrates the preparation of a flexible product from epoxidized soybean oil and an adduct of maleic anhydride and a 1,2,6-hexanetriol-polypropylene glycol polyhdric alcohol having a molecular weight of 1500.

31 parts of epoxidized soybean oil was combined with 69 parts of the adduct as noted above, 2% of magnesium oxide and 200 parts of ammonium perchlorate. The mixture was stirred and placed in a mold and heated at 120° C. The resulting product was a hard flexible casting.

*Example XIII*

About 42 parts of a glycidyl ester of trimerized soybean oil fatty acids having an epoxy value of .38 eq./100 g., 58 parts of an adduct of maleic anhydride and a polyether of 1,2,6-hexanetriol and propylene oxide as described in Example XII, 2% magnesium oxide and 200 parts of ammonium perchlorate. The mixture was stirred and placed in a hard tough flexible casting.

*Example XIV*

About 25 parts of a glycidyl ether of polyepichlorohydrin having an epoxy value of .44 eq./100 g., 75 parts of an adduct of maleic anhydride and a polyether of 1,2,6-hexanetriol and propylene oxide as described in Example XII, 2% magnesium oxide and 200 parts of ammonium perchlorate. The mixture was stirred and placed in an oven at 80° C. for several hours. The resulting product was a hard tough flexible casting.

Example XV

About 45 parts of a copolymer of butadiene and allyl glycidyl ether having an epoxy value of .23 eq./100 g., 55 parts of an adduct of maleic anhydride and a polyether of 1,2,6-hexanetriol and propylene oxide as described in Example XII, 2% zinc oxide and 200 parts of ammonium perchlorate. The mixture was stirred and placed in an oven at 80° C. for several hours. The resulting product was a hard tough flexible casting.

Example XVI

About 17 parts of diglycidyl ether of resorcinol having an epoxy value of 83 eq./100 g., 83 parts of an adduct of maleic anhydride and a polyether of 1,2,6-hexanetriol and propylene oxide as described in Example XII, 2% magnesium oxide and 200 parts of ammonium perchlorate stirred and placed in an oven at 80° C. for several hours. The resulting product was a tough hard flexible casting.

Example XVII

About 28 parts of polyglycidyl ester of mixture of sebacic and adipic acids having an epoxy value of .52 eq./100 g., 72 parts of an adduct of maleic anhydride and a polyether of 1,2,6-hexanetriol and propylene oxide as described in Example XII, 3% magnesium oxide and 200 parts of ammonium perchlorate were combined. The mixture was stirred and placed in an oven at 80° C. for several hours. The resulting product was a tough hard flexible casting.

Example XVIII

About 22 parts of epoxidized 2,2'-dimethyl tetrahydrobenzyl tetrahydrobenzoate having an epoxide value of .71 eq./100 g., 80 parts of an adduct of maleic anhydride and a polyether of 1,2,6-hexanetriol and propylene oxide as described in Example XII, 2% magnesium oxide and 200 parts of ammonium perchlorate were combined. The mixture was stirred and placed in an oven and heated at 80° C. for 22 hours. The resulting product was a hard tough flexible casting.

Related results are obtained by replacing the above described polyepoxide with epoxidized tetrahydrobenzyl tetrahydrobenzoate.

Example XIX

Example XVIII was repeated with the exception that the polyepoxide was vinyl cyclohexene dioxide. The resulting product was a hard tough flexible casting.

Example XX

Example XVIII was repeated with the exception that the polyepoxide was glycidyl ether of 2,3-epoxypropylphenol. The resulting product was a hard tough flexible casting.

Example XXI

Example XVIII was repeated with the exception that the polyepoxide was glycidyl ether of 2,6-bis(2,3-epoxypropyl)phenol. The resulting product was a hard tough flexible casting.

Example XXII

Examples I to XX are repeated with the exception that the activator employed was a zinc oxide, barium oxide and cadmium oxide. Good cures are obtained in each case.

Example XXIII

Example XVIII was repeated with the exception that the polyepoxide was epoxidized dipentene. The resulting product was a hard flexible casting.

Example XXIV

Examples XII to XXIII are repeated with the exception that the adduct is an adduct of maleic anhydride and a polyhydric alcohol having a molecular weight of 2600 and comprising the reaction product of glycerol and a mixture of ethylene oxide and propylene oxide. Related results are obtained.

I claim as my invention:

1. A process for producing a resinified product which consists of mixing and reacting a polyepoxide having more than one vicinal epoxy group with (1) a polycarboxylic acid which is a half ester of a cyclic anhydride of the formula

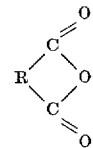

wherein R is a radical derived from a polycarboxylic acid by removing 2 of the carboxyl groups and a long chain polyhydric alcohol having a molecular weight of at least 400 wherein the OH groups of the said alcohol molecule are esterified with a molecule of the anhydride so as to leave at least 2 of the carboxyl groups formed by this reaction as free carboxyl groups, and (2) from .1% to 10% by weight of the polyepoxide of an oxide of a metal of the group consisting of magnesium, barium, zinc and cadmium.

2. A process for producing a resinified product which consists of mixing and reacting a polyepoxide having a 1,2-epoxy equivalency greater than 1.1 with (1) at least .8 equivalent of a polycarboxylic acid which is a half ester of a cyclic anhydride of the formula

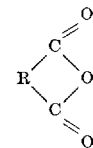

wherein R is a radical derived from a polycarboxylic acid by removing 2 of the carboxyl groups and a long chain polyhydric alcohol having a molecular weight of at least 400 wherein the OH groups of the said alcohol molecule are esterified with a molecule of the anhydride so as to leave at least 2 of the carboxyl groups formed by this reaction as free carboxyl groups, and (2) from .1% to 4% by weight of the polyepoxide of an oxide of a metal of the group consisting of magnesium, barium, zinc and cadmium.

3. A process as in claim 2 wherein the polyepoxide is a glycidyl polyether of a polyhydric phenol having a 1,2-epoxy equivalency between 1.1 and 2.0 and a molecular weight between 200 and 800.

4. A process as in claim 2 wherein the polycarboxylic acid is a half ester of a cyclic anhydride and a long chain polyhydric alcohol having a molecular weight between 600 and 10,000 and is the reaction product of a polyhydric alcohol and an alkylene oxide.

5. A process as in claim 2 wherein the metal oxide is magnesium oxide.

6. A process as in claim 2 wherein the metal oxide is zinc oxide.

7. A process as in claim 2 wherein the metal oxide is barium oxide.

8. A process as in claim 2 wherein the polyepoxide is an epoxidized ester of an ethylenically unsaturated alcohol and an ethylenically unsaturated acid.

9. A process as in claim 2 wherein the polyepoxide is a glycidyl ether of a polyhydric alcohol.

10. A process as in claim 2 wherein the polyepoxide is a glycidyl ether of polyepichlorohydrin.

11. A process as in claim 2 wherein the polyepoxide is epoxidized tetrahydrobenzyl tetrahydrobenzoate.

12. A process for producing a resinified product useful as a binder for solid propellants which consists of mixing and reacting a glycidyl polyether of a polyhydric phenol with at least .8 equivalent of a polycarboxylic acid consisting of a half ester of maleic anhydride and a polyhydric alcohol having a molecular weight between 400 and 10,000 consisting of an adduct of an aliphatic polyhydric alcohol containing from 2 to 4 hydroxyl groups and 2 to 10 carbon atoms and an alkylene oxide, and an activator therefor consisting of .1% to 4% by weight of the glycidyl polyether of an oxide of magnesium.

13. A process as in claim 12 wherein the polycarboxylic acid has the formula

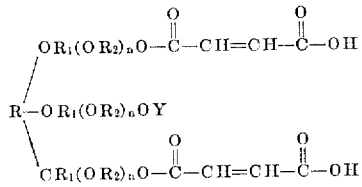

wherein R is the residue of the aliphatic polyhydric alcohol containing 2 to 4 OH groups and 2 to 10 carbon atoms obtained by removing the OH groups, $R_1$ and $R_2$ are alkylene radicals, $n$ is an integer greater than 1 and such that the molecular weight of the polyhydric alcohol adduct is between 400 and 10,000, and Y is a member of the group consisting of hydrogen and a

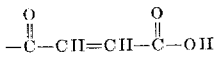

radical.

References Cited by the Examiner

UNITED STATES PATENTS

| | | | |
|---|---|---|---|
| 2,397,602 | 4/1946 | Gresham | 260—78.4 |
| 2,643,245 | 6/1953 | Wilson | 260—78.5 |
| 2,671,773 | 3/1954 | Giammaria | 260—78.5 |
| 2,682,515 | 6/1954 | Naps | 260—37 |
| 2,765,296 | 10/1056 | Strain | 260—2 |
| 2,783,138 | 2/1957 | Parsons | 52—0.5 |
| 2,857,258 | 10/1958 | Thomas | 52—0.5 |
| 2,895,947 | 7/1959 | Shokal et al. | 260—78.4 |
| 2,935,488 | 5/1960 | Phillips et al. | 260—47 |
| 2,947,717 | 8/1960 | Belanger et al. | 260—47 |

FOREIGN PATENTS 133,819   8/1949   Australia.

OTHER REFERENCES

"The Merck Index of Chemicals and Drugs," sixth edition, pp. 118 and 592 relied on, 1952.

WILLIAM H. SHORT, *Primary Examiner.*

ROGER L. CAMPBELL, LEON D. ROSDOL, C. D. QUARFORTH, *Examiners.*

B. R. PADGETT, W. I. ANDRESS, J. W. WHISLER, T. D. KERWIN, *Assistant Examiners.*